United States Patent [19]
Massa

[11] 3,716,827
[45] Feb. 13, 1973

[54] MOUNTING STRUCTURE FOR SPHERICAL SHAPED UNDERWATER TRANSDUCER

[75] Inventor: Frank Massa, Cohasset, Mass.

[73] Assignee: Massa Division Dynamics Corporation of America, Hingham, Mass.

[22] Filed: Aug. 3, 1970

[21] Appl. No.: 60,258

[52] U.S. Cl. .................. 340/8 S, 310/9.1, 340/12
[51] Int. Cl. .................................................. G01v 1/00
[58] Field of Search .................. 310/9.1, 9.7; 340/8–14

[56] References Cited

UNITED STATES PATENTS

| | | | |
|---|---|---|---|
| 2,610,018 | 9/1952 | Rettinger | 340/8 R |
| 2,424,549 | 7/1947 | Black, Jr. et al. | 340/8 R |
| 2,417,426 | 3/1947 | Mason | 310/9.1 |

Primary Examiner—Benjamin A. Borchelt
Assistant Examiner—H. J. Tudor
Attorney—Louis Bernat

[57] ABSTRACT

A spherical underwater transducer is flexibly suspended by means of a rubber-like belt equatorially surrounding the sphere. The belt has mounting brackets molded therein and undercut cooling slots formed therein.

9 Claims, 4 Drawing Figures

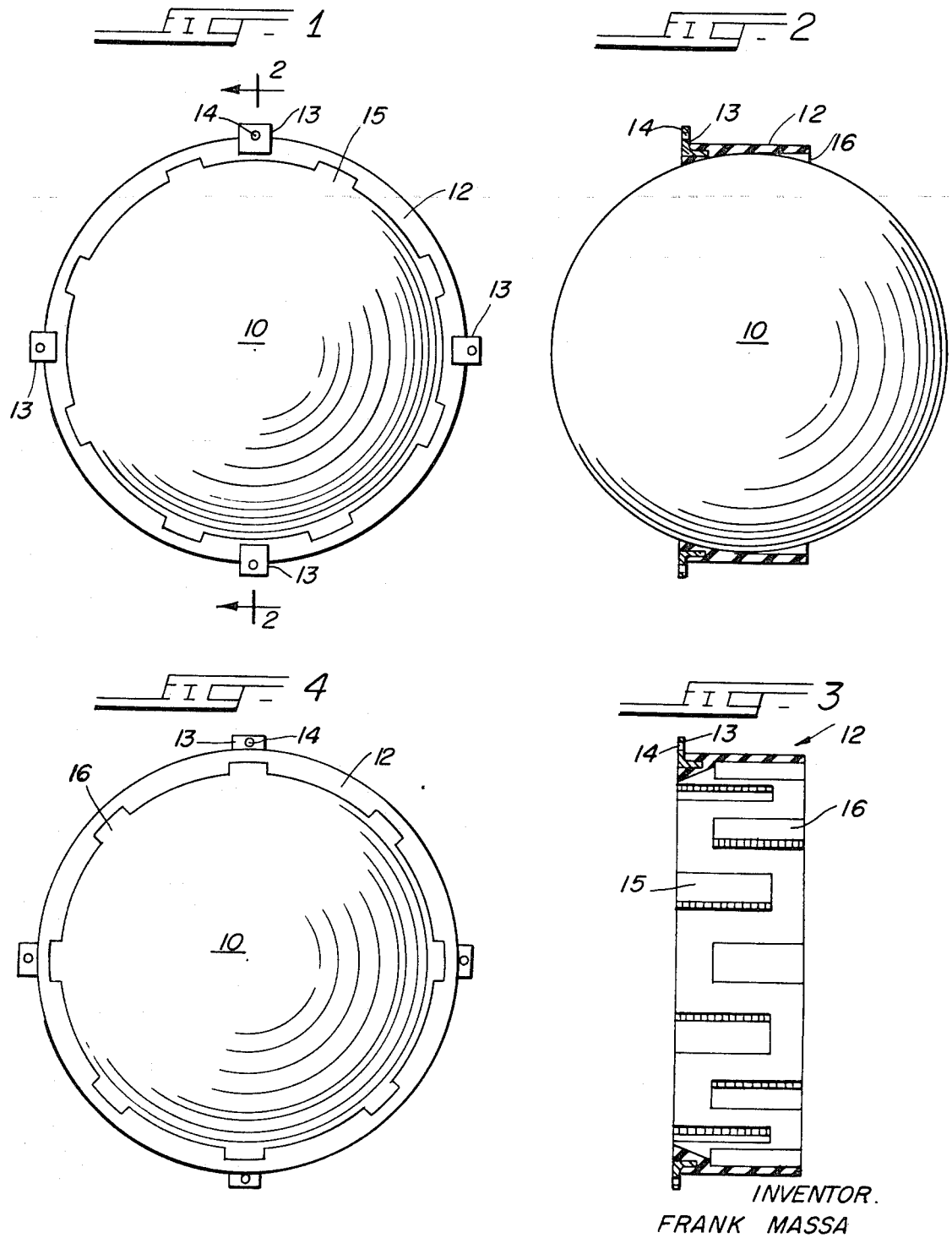

MOUNTING STRUCTURE FOR SPHERICAL SHAPED UNDERWATER TRANSDUCER

This invention relates to a flexible mounting structure, and more particularly to means for holding a spherically shaped transducer in a desired position in an array frame.

This invention is particularly well adaptable for mounting and supporting an inertial electromagnetic, spherical, underwater transducer such as that described in U.S. Pat. No. 3,319,220 issued on May 9, 1967, to Frank Massa, Jr., and assigned to the assignee of this application. The invention enables the transducers of this type to freely execute translational vibrations into the surrounding medium within which an array is immersed. More particularly, a spherically shaped transducer is flexibly suspended by a belt-like band of pliable, rubber-like material which is fitted around the periphery of the transducer. This band is contoured on its inner and outer surfaces in a manner such that the sphere is held captive and, at the same time, is free to vibrate relative to the fixed frame structure to which the transducer is attached.

Accordingly, an object of this invention is to provide an efficient mounting for a spherical transducer. More particularly, an object is to enable the transducer to freely execute oscillatory vibrations along an axis of the sphere. Here, an object is to prevent restrictive vibrational interference from the mounting structure.

Another object of this invention is to provide a flexible mounting structure with an inner surface contoured to conform to the external surface of the transducer. In this connection, an object is to conform the transducer and the flexible support in the region where the mounting is to be attached. Further, an object is to make the outer contour of the belt conform to and tightly fit in an opening in a mounting structure within which the transducer is to be operationally attached.

A still further object of this invention is to provide a flexible mount for a spherical underwater transducer with the mount being attached to the surface of the transducer in the vicinity of its equatorial region. Here, an object is to provide such a mount with its inner surface undercut in regions to provide improved cooling, for the transducer, during high power underwater operation.

In keeping with an aspect of the invention, these and other objects are provided by a flexible belt-like mounting structure which may be stretched over and cemented to the outer surface of the equatorial region of a spherical transducer. The belt has a plurality of rigid mounting brackets which are bonded securely about the periphery of the flexible belt-like mounting structure. These mounts permit an exact placement and assembly of the flexibly-mounted transducer element in a rigid frame structure or array frame.

This invention contemplates other objects, features and advantages which will become more fully apparent from the following detailed description when taken in conjunction with the accompanying drawings which illustrate a preferred embodiment and in which:

FIG. 1 is a front plan view of a spherical transducer incorporating one illustrative embodiment of the flexible mounting structure;

FIG. 2 is a cross-sectional view of the mounting structure taken along the line 2—2 of FIG. 1—with the spherical transducer being shown in a full non-sectional view within the cross-sectioned peripheral mounting structure;

FIG. 3 shows essentially the same cross-sectional view of the mounting (as seen in FIG. 2) except that the spherical transducer is removed so that more details of the flexible belt-like mounting structure may be seen; and FIG. 4 is a rear plan view of the assembled structure illustrated in FIG. 1.

The same reference characters identify the same parts throughout the various figures. More particularly, the reference character 10 identifies a spherical underwater transducer, which, for example, may be of the type described in U.S. Pat. No. 3,319,220. This particular transducer design is well adapted for low frequency, high power, deep water usage. In general, this patent shows a spherically shaped enclosure, driven as a single whole unit in a translatory mode of vibration responsive to electromagnetic forces generated between the spherical outer housing and internal spring-mounted inertial mass members.

In order to mount the spherical transducer element in a supporting rigid frame, and at the same time permit unimpeded oscillatory vibration of the spherical element, a flexible belt-like band 12 is equatorially attached to the periphery of the sphere. The plane of this equatorial attachment lies at right angles to the axis of transducer vibrations. The attachment may be accomplished by cement or other suitable means.

This band may, for example, be molded rubber. Metal brackets 13 are firmly secured to the periphery of the rubber belt 12. For example, these brackets may be inserted into a mold during the manufacture of the belt member 12. Each bracket 13 is provided with a hole 14 through which a bolt may be passed for securely attaching the assembly to a rigid structure.

The band or belt 12 reliably secures the transducer in place and yet enables it to remain free to vibrate in any direction. For example, the transducer might be attached to a rigid structure, such as the rear surface of the underwater horn illustrated in FIG. 1 of U.S. Pat. No. 3,319,220. There, the spherical transducer radiates acoustic energy through a horn opening. According to another example, the rigid structure might also be an array frame which is designed to locate a number of transducers in a desired configuration for producing a specified radiation beam pattern and sound power level. Such an array structure is illustrated in a copending application Ser. No. 61,198, filed Aug. 5, 1970, entitled "BAFFLE STRUCTURE FOR UNDERWATER TRANSDUCER ARRAY," and assigned to the assignee of this invention.

The spherical transducers of this invention may be applied to large, high power underwater sound source devices weighing as much as a thousand pounds each. These devices develop several kilowatts of acoustic power. Thus, it is necessary for the transducers to be securely held in a desired location. At the same time, the transducers should be free to vibrate without restriction in order to operate efficiently.

This basic objective of secure support and vibrational freedom is achieved by shaping the inner surface of the belt-like member 12 to fit the spherical shape of the transducer to which it is attached. The outer surface of the member 12 is shaped in the form of a cylinder. When the outer surface of the flexible mount 12 is confined within a rigid cylindrical opening, it provides a mounting structure for the transducer. The spherical transducer remains securely cradled into its exact nested position when the brackets 13 are bolted to mating mounting brackets (not shown) located about the periphery of the rigid cylindrical opening in the mounting structure.

It is necessary or desirable to provide additional cooling for preventing an overheating of the transducer when it operates at high power levels. Therefore, undercut regions or slots 15 and 16 are recessed into the inner surface of the flexible band 12. These slots 15 provide a communicating passageway between the equatorial region of the sphere 10 and one edge of the band 12. The slots 16 provide similar communicating passageways between the equatorial region of the sphere and the other edge of the band 12. These undercut slots serve two desirable functions. First, they allow water to enter and make contact with the equatorial region of the transducer housing shell, thereby conducting heat away from the transducer housing. The resulting degree of cooling is far greater than it would be if the rubber belt 12 were solid. If, for any reason, a solid belt must be used, it would be well to provide an increased thermal conductivity covering over the equatorial area of the sphere.

The presence of the slots 15 and 16 also provides increased compliance in the wall thickness of the rubber belt 12. Thus, the belt may be easily forced into a tight cylindrical opening to maintain a desirable interference fit therein. The interference fit of the compliant rubber belt structure, in the cylindrical structural openings, has an advantage since it damps any mechanical vibrations of the frame. This is desirable since it prevents vibration damage to the structure that might otherwise occur under non-damped, high-amplitude operation.

The mounting structure described thus far is primarily developed for efficiently mounting a spherically shaped transducer. However, it could also be used advantageously with a cylindrical shaped transducer, such as, for example, the cylindrical transducer 10 illustrated in U.S. Pat. No. 3,205,476, issued on Sept. 7, 1965. For the cylindrical transducer, both the inside and outside surfaces of the flexible belt structure 12 should have a conforming cylindrical shape.

While I have shown and described a specific embodiment of the present invention, it should be understood that various modifications and alternative constructions may be made without departing from the true spirit and scope of the invention. Therefore, it is intended by the appended claims to cover all equivalent and alternative constructions which might fall within their true spirit and scope.

I claim:

1. A vibratile system for the generation of acoustic energy responsive to electrical signals, said system comprising an electroacoustic transducer means having a substantially spherical shape for executing translatory vibrations along a particular axis when energized by said signals, means for flexibly and securely mounting said transducer in a rigid structure, said mounting means including a belt of resilient material equatorially surrounding the external surface of said transducer which lies in a plane at right angles to said axis of vibration, and fastening means associated with said belt of resilient material for securely retaining said transducer in an accurate position relative to said rigid structure.

2. The system of claim 1 wherein said belt includes undercut regions in contact with said sphere, said undercut regions enabling water to reach the equatorial region of said sphere when it is operating under water.

3. The system of claim 2 wherein said undercut regions alternately enter from opposite sides of said belt and extend toward the middle of said belt.

4. A transducer mounting for a spherical vibratile system, said system comprising an electroacoustic transducer means having a substantially spherical shape for executing translatory vibrations along a particular axis, said mounting structure including a belt of resilient material surrounding the external surface of the equatorial region of said transducer, said equatorial region containing a circle of maximum diameter on the surface of said transducer which lies in a plane at right angles to said axis of vibration, said belt of resilient material being characterized in that regions of the material are undercut at spaced intervals around the inner peripheral surface of said belt which is in contact with the surface of said transducer.

5. The invention in claim 4 being further characterized in that the inner surface of said resilient belt is contoured to have a concave shape which mates with and compliments the external convex surface of said spherically shaped transducer.

6. The invention in claim 5 being still further characterized in that the outer surface of said resilient belt is contoured to have a cylindrical shape, with the axis of said cylinder lying along the particular axis of translatory vibrations.

7. The invention in claim 4 and a bonding agent between the inner surface of said resilient belt and the outer mating surface of said transducer.

8. The invention in claim 4 being still further characterized in that said resilient belt is a molded elastomer material.

9. The invention in claim 8 and metal mounting brackets molded into said resilient belt for securing the transducer and belt assembly to a rigid frame.

* * * * *